US008450645B2

(12) United States Patent
Gelmetti

(10) Patent No.: US 8,450,645 B2
(45) Date of Patent: May 28, 2013

(54) FLEXIBLE GUIDE DEVICE FOR A WELDING ROD

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 507 days.

(21) Appl. No.: 12/593,271

(22) PCT Filed: Mar. 14, 2008

(86) PCT No.: PCT/EP2008/002068
§ 371 (c)(1), (2), (4) Date: Sep. 25, 2009

(87) PCT Pub. No.: WO2008/116567
PCT Pub. Date: Oct. 2, 2008

(65) Prior Publication Data

US 2010/0116803 A1 May 13, 2010

(30) Foreign Application Priority Data

| | | |
|---|---|---|
| Mar. 27, 2007 | (DE) | 10 2007 014 567 |
| Apr. 2, 2007 | (DE) | 10 2007 015 946 |
| Jul. 19, 2007 | (EP) | 07014170 |

(51) Int. Cl.
*B65H 23/00* (2006.01)

(52) U.S. Cl.
USPC .................. 219/137.51; 219/136; 242/615.3; 226/196.1

(58) Field of Classification Search
USPC ................ 285/146.1, 261, 146.3; 219/137.51
See application file for complete search history.

(56) References Cited

U.S. PATENT DOCUMENTS

| | | | | |
|---|---|---|---|---|
| 1,276,117 | A * | 8/1918 | Riebe | 464/171 |
| 2,329,369 | A | 9/1943 | Haver | 285/11 |
| 2,457,910 | A | 1/1949 | McLaren et al. | 74/501 |
| 2,483,760 | A | 10/1949 | Duncan | 254/190 |
| 3,274,850 | A | 9/1966 | Tascio | 74/501 |
| 3,344,682 | A | 10/1967 | Bratz | 74/501 |
| 3,730,136 | A * | 5/1973 | Okada | 118/78 |
| 4,540,225 | A | 9/1985 | Johnson et al. | 339/16 RC |
| 5,215,338 | A | 6/1993 | Kimura et al. | 285/166 |
| 5,585,013 | A * | 12/1996 | Truty | 219/69.12 |
| 7,533,906 | B2 * | 5/2009 | Luettgen et al. | 285/146.1 |
| 2002/0120178 | A1 | 8/2002 | Tartaglia et al. | 600/114 |
| 2007/0284354 | A1 * | 12/2007 | Laymon | 219/137.51 |
| 2009/0200284 | A1 * | 8/2009 | Sanchez | 219/137.51 |

FOREIGN PATENT DOCUMENTS

| | | |
|---|---|---|
| DE | 2525938 | 12/1976 |
| DE | 36 09 839 | 10/1989 |
| DE | 199 10 128 | 1/2001 |
| EP | 1974846 | 10/2008 |
| FR | 2 888 825 | 7/2005 |
| WO | WO2006091075 | 8/2006 |
| WO | WO 2007/010171 | 1/2007 |

OTHER PUBLICATIONS

PCT International Search Report, dated Nov. 6, 2008.
European Search Report, dated Sep. 17, 2008.
Office Action issued for related U.S. Appl. No. 12/618,250, dated Apr. 26, 2012 (11 pgs).

* cited by examiner

*Primary Examiner* — Steven Loke
*Assistant Examiner* — David Goodwin
(74) *Attorney, Agent, or Firm* — Hayes Soloway P.C.

(57) ABSTRACT

A flexible guide device for a welding wire, formed by a plurality of individual elements which are connected to each other in an articulated manner, characterized in that the individual elements are adapted to swivel in relation to each other in any direction.

22 Claims, 18 Drawing Sheets

B - B
C - C

A - A

E - E

F - F

D - D

A-A
B-B
A
B
10
12
14
16
20
26
34
50
52
54 a)
b)
c)
d)
e)
f)
g)
h)
A-A
20
70
50
14
16
72
74
76
12
A

FLEXIBLE GUIDE DEVICE FOR A WELDING ROD

BACKGROUND OF THE INVENTION

The present invention relates to a flexible guide device, in particular for a welding wire, formed by a plurality of individual elements which are connected to each other in an articulated manner.

A guide device of this type may be used for guiding the welding wire used by a welding robot between a container for the welding wire and the welding head. The guide device must be flexible so as not to impede the movements of the welding head. Furthermore, the guide device needs to ensure that the welding wire can not kink because kinks in the welding wire would interrupt the automated welding process. Finally, the guide device is required to protect the welding wire from soiling and, in arc welding, from contact with other objects, if required, in order to prevent a short circuit.

A major part of the problems arising in automated welding is caused by the friction of the welding wire which occurs inside the guide devices in which the welding wire is guided from the welding wire container to the driving rollers of the wire feeding device and from there to the welding head. The friction leads to stress marks and deformations appearing on the surface of the welding wire. In arc welding, this results in a decrease in the conductivity, in problems with the electric arc, and in an impairment of the weld quality. If the chips produced by friction or the lubricant used to reduce the friction accumulate on the surface of the welding wire, this results in the welding wire being fed non-uniformly, in the guide devices being plugged up, and in problems with the arc at the welding head. If the welding wire is bent excessively on its path from the welding wire container to the welding head, the bent point which is then supplied to the welding head results in that the arc runs beside the place at which the welding seam should be actually located, which then requires expensive reworking steps.

In order to avoid stress marks on the surface of the welding wire, attempts have already been made to use welding wire guide devices made of plastic. However, the welding wire cuts through the plastic sheathing after a relatively short time so that considerable problems arise in the feeding. In the case of welding wire made of aluminum or an aluminum alloy or in the case of welding wire having a passivated surface, stress marks in the surface of the welding wire may cause considerable problems with the welding performance. All of these problems underline the significance of a low-friction feeding of the welding wire to the welding head.

An example of a flexible welding wire guide device is shown in WO 2007/010171 A2. This guide device consists of various individual elements, each individual element being connected to the neighboring individual element by a swivel bearing which allows a movement only about a particular axis. Bearing rollers or similar guiding formations for the welding wire are fitted inside the base bodies of the individual elements. All in all, this solution involves a very high structural expenditure and therefore very high costs.

The object of the present invention resides in providing a low-cost guiding device for a welding wire which allows the welding wire to be guided with low resistance and at low cost.

SUMMARY OF THE INVENTION

For this purpose, provision is made according to the invention that the individual elements are adapted to swivel in relation to each other in any direction. This allows universal individual elements to be used which during assembly need not be put together in any particular order.

Preferably, the individual elements are connected to each other in the nature of a ball joint. This makes it possible in particular to lock the individual elements with each other in a simple manner by a ball head of one individual element snapping into a ball socket of the neighboring individual element.

Preferably, each individual element is provided with a guiding formation for the welding wire which allows a low-friction shifting of the welding wire in the interior of the guide device. The guiding formation may be in the form of a simple ring made of a low-friction material, for example made of ceramics, or in the form of a plurality of rolling bodies accommodated in the individual body, such as balls or cylinder rollers.

According to a preferred embodiment, a flexible sheathing is arranged around the guide device, for example a plastic hose. It prevents dust or other dirt particles from being able to enter into the guide device and causing an increased friction there.

BRIEF DESCRIPTION OF THE DRAWINGS

The invention will be described below with reference to various embodiments which are illustrated in the accompanying drawings, in which:

FIGS. 7 and 7*a*-7*m* show a guide device according to a seventh embodiment;

FIGS. 8 and 8*a*-8*d* show a guide device according to an eighth embodiment;

DETAILED DESCRIPTION OF THE INVENTION

Figures 1, 1A, 1B, 1C, 1D, 1E, 1F, 1G, 1H, 1I, 1J:
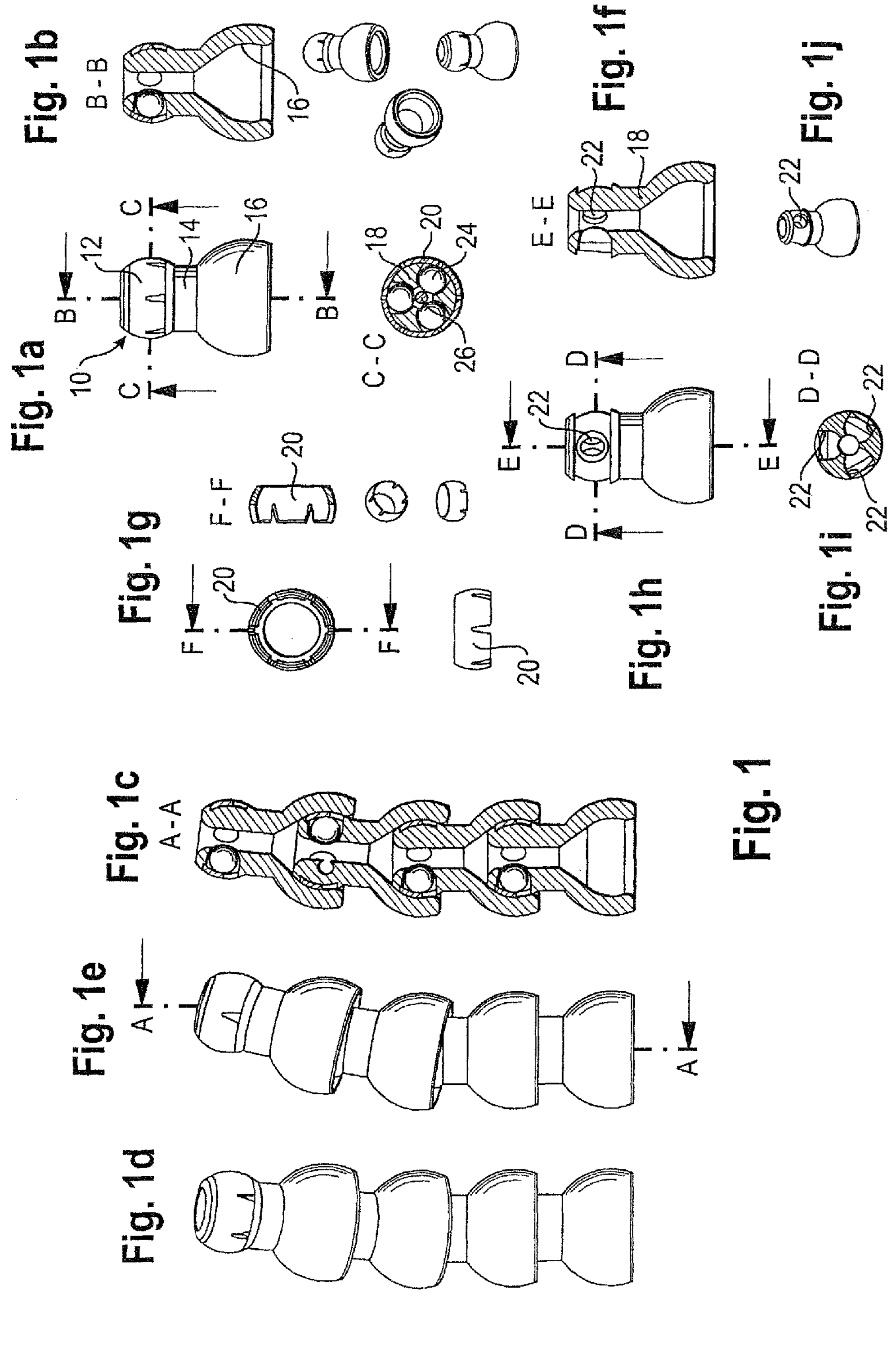
FIGS. 1 and 1*a*-1*j* show a guide device according to a first embodiment.

FIGS. 1 and 1*a*-1*j* shows a guide device, in particular for welding wire, which consists of a plurality of individual elements 10. Each individual element includes a body 14 having a ball head 12 and a ball socket 16. The ball socket 16 (see also FIG. 1*b*) is designed such that it can be snapped onto the ball head 12 of a neighboring individual element 10, i.e. automatically locks in place there. In this way, a sequence of a plurality of individual elements can be formed which then as a whole forms the guide device for the welding wire (see FIGS. 1*c*, 1*d* and 1*e*).

Each body 14 is formed here by a base body 18 (see FIG. 1*f*) and an extension 20. The extension 20 is placed onto the base body 18 in the area in which the ball head 12 is to be formed later. Below the area which is covered by the extension 20, three recesses 22 are formed in the base body 18 (see FIGS. 1*f*, 1*h*, 1*i* and 1*j*). A rolling body in the form of a ball 24 is inserted in each recess 22 (see FIG. 1*k*). The three balls 24 together define a guiding formation for a welding wire 26 which is guided inside the individual elements 10. The extension 20 makes sure that the balls 24 can not leave the recesses 22 towards the outside.

As can be seen in FIGS. 1*c* to 1*e*, each individual element 10 is adapted to swivel in the respective ball joint in relation to the neighboring individual element. In this way, the welding wire guide device formed by the individual elements can flexibly adjust to the respectively required course. The guiding formation for the welding wire as formed by the balls 24 ensures that the welding wire is guided with low friction inside the guide device, without a high friction occurring and without the welding wire being scratched, or else, being able to damage the individual elements.

The length of the ball socket or of the skirt, forming the ball socket, of the base body 14 is dimensioned such that the maximum swiveling capacity of an individual element relative to the neighboring individual element is limited, more specifically to an extent such that the welding wire running through the maximum curved guide device rests only against the guiding formation and not against the base bodies. This makes sure that it is smoothly guided and the base bodies are not destroyed.

The welding wire guide device shown distinguishes itself by a particularly compact structure. With a welding wire diameter of 1.9 mm, balls having a diameter of 4 mm may be used. The ball head has an outside diameter of 11 mm, and the maximum diameter of the individual element amounts to 16 mm with an overall length of roughly 20 mm. Owing to the cooperation of the ball socket 16 with the ball head 12, the individual elements are connected with each other so tightly that no additional protection is necessary against any dust etc. penetrating from the outside.

FIGS. 2 and 2*a*-2*c* shows a welding wire guide device according to a second embodiment. The same reference numerals are used for the parts known from the preceding embodiment, and reference is made to the above discussion in this respect.

Figures 2, 2A, 2B, 2C:
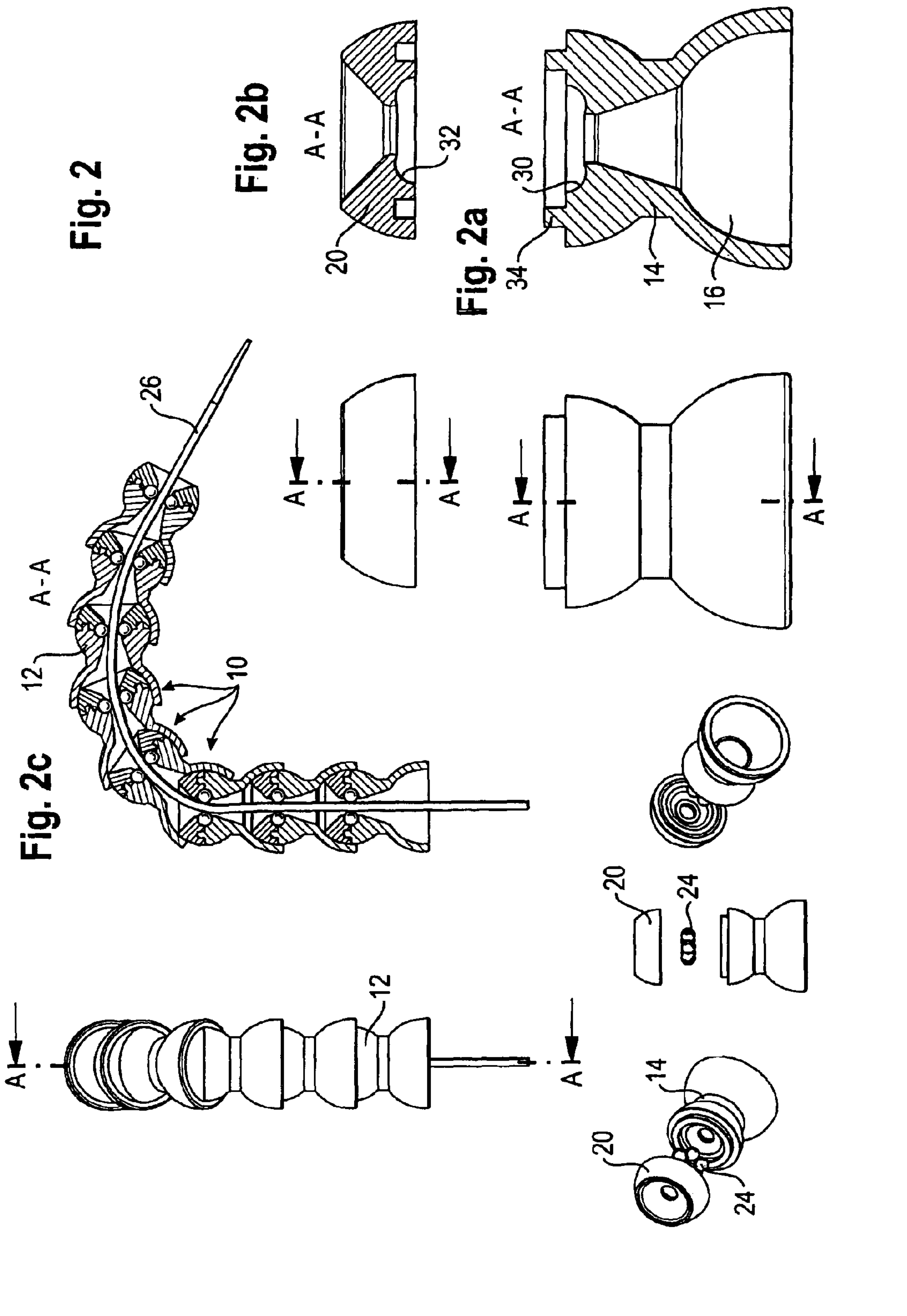
FIGS. 2 and 2*a*-2*c* show a guide device according to a second embodiment.

The difference from the first embodiment consists essentially in the configuration of the guiding formation for the welding wire. For the guiding formation, five balls 24 are used here, which are inserted in an encircling seat 30 (see FIG. 2*a*). An opposite surface 32 is formed in the extension 20 (see FIG. 2*b*) which is locked onto a locking ring 34 on the base body 14. The extension 20 together with a suitably shaped surface on the base body 14 forms the ball head 12 of the individual element 10. The balls 24 together constitute the guiding formation for the welding wire 26 (see in particular FIG. 2*c*) which is guided with low friction by the balls inside the individual elements 10 even if the guide device formed by the individual elements shows a comparatively narrow curvature as shown in FIG. 2*c*. In this embodiment too, the length of the ball socket or of the skirt forming the ball socket of the base body 14 is dimensioned such that the maximum swiveling capacity of an individual element in relation to the neighboring individual element is limited, more particularly to an extent such that the welding wire running through the maximum bent guide device rests only against the guiding formation, rather than against the base bodies.

Figure 3:
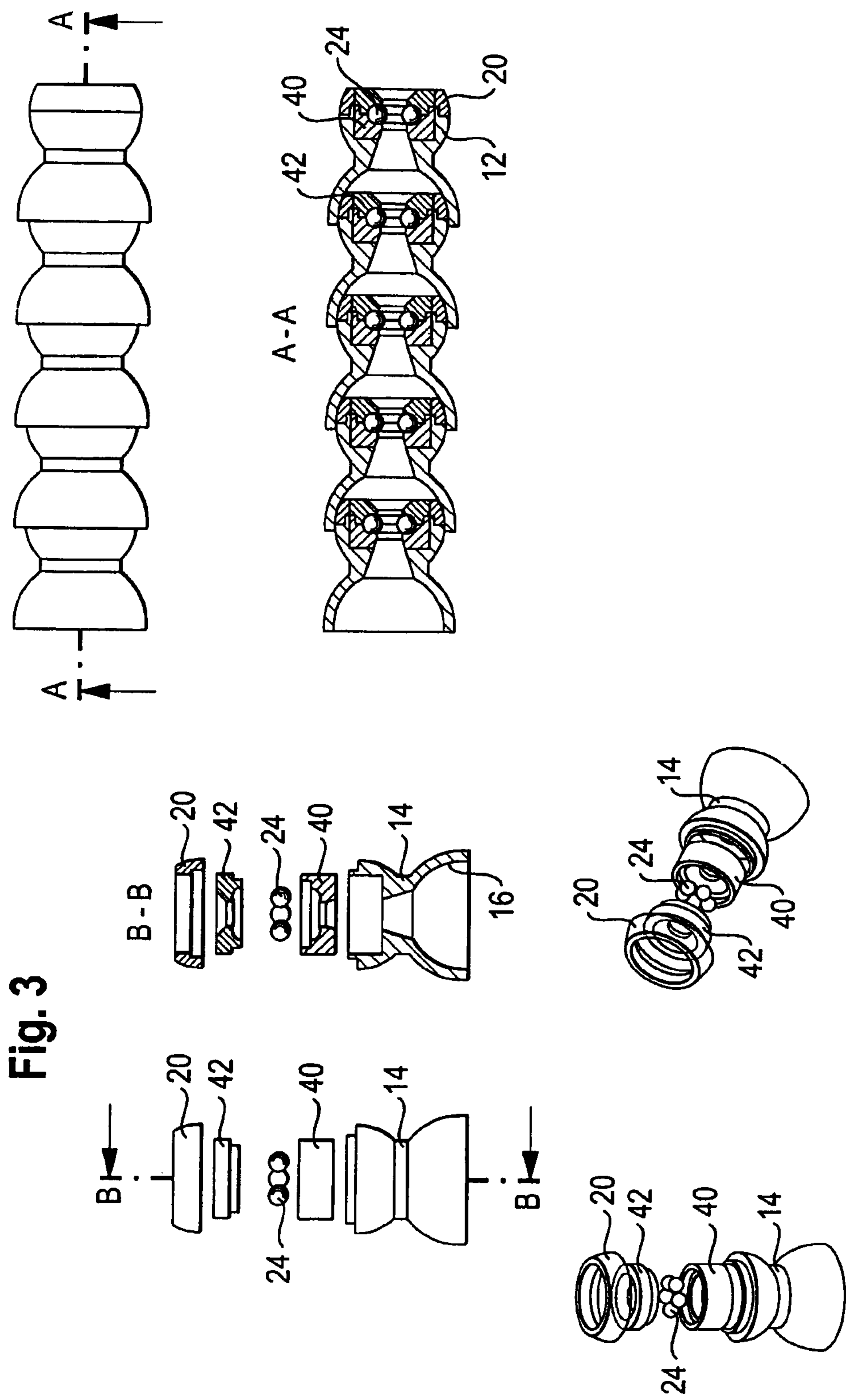
FIG. 3 show a guide device according to a third embodiment.

FIG. 3 shows a further embodiment. The same reference numerals are used for the parts known from the preceding embodiments, and reference is made to the above explanations in this regard.

The embodiment according to FIG. 3 differs from the embodiment shown in FIG. 2 essentially in that a race 40 made of a wear-resistant material is inserted in the base body 14. It acts similarly to the race of a ball bearing and is completed by a counterpart 42 which is placed onto the race 40. The race 40 and the counterpart 42 are made of a wear-resistant material such as, e.g., steel. The race 40 and the counterpart 42 are held on the base body 14 by the extension 20 which is placed on the base body 14. Also in this embodiment, the ball head 12 of the base body 14 is formed by the extension 20 together with a suitably shaped surface section of the base body. The ball socket 16 corresponds to that of the first and second embodiments. The guiding formation formed in the third embodiment for the welding wire essentially corresponds to the guiding formation known from the second embodiment.

FIGS. 4 and 4*a*-4*h* shows a fourth embodiment. The same reference numerals are used for the parts known from the preceding embodiments, and reference is made to the above explanations in this respect.

Figures 4, 4A, 4B, 4C, 4D, 4E, 4F, 4G, 4H, 4I:
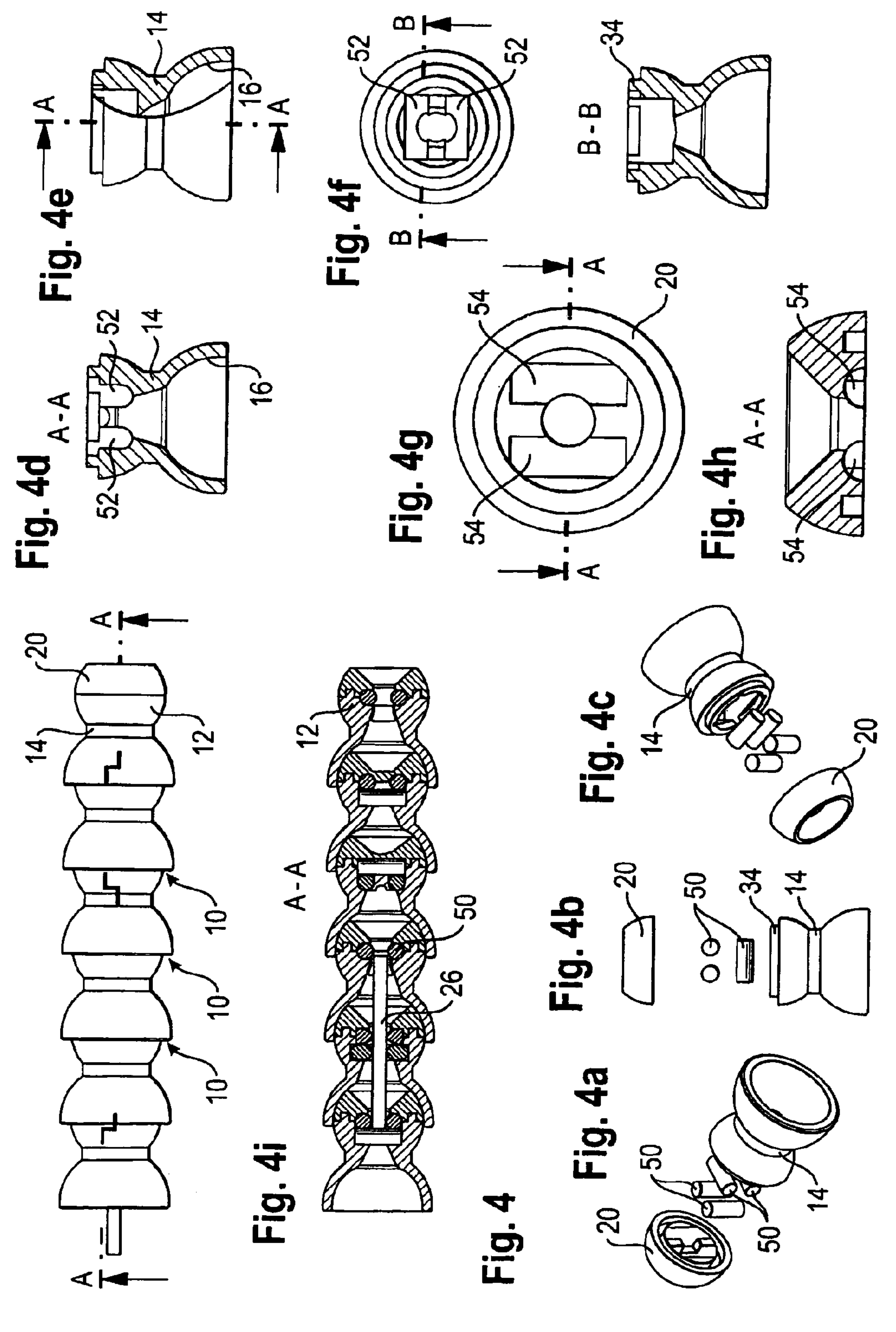
FIGS. 4 and 4*a*-4*h* show a guide device according to a fourth embodiment.

The embodiment according to FIG. 4 differs from the second embodiment essentially in that for the guiding formation no ball-shaped rolling bodies are used, but rolling bodies 50 in the shape of cylinder rollers. These are arranged opposite each other in pairs, the second pair being rotated through 90° in relation to the first pair (see FIGS. 4*a*, 4*b* and 4*c*). The cylinder rollers 50 of the first pair are supported here against the cylinder rollers 50 of the second pair. Guide surfaces 52 for the cylinder rollers 50 of the first pair are formed in the base body 14 (see FIGS. 4*d* to 4*f*), while opposite guide surfaces 54 are provided in the extension 20 (see FIGS. 4*g* and 4*h*). As can be seen in FIG. 4*i*, the cylinder rollers 50 are held in the base body so as to be adjacent to each other when the extension 20 is placed on the base body 14. In this way, a guiding formation for the welding wire 26 is defined inside the base bodies.

Provision could also be made for inserting the rolling bodies into small clip-type bearing clamps or surfaces.

Figure 5:
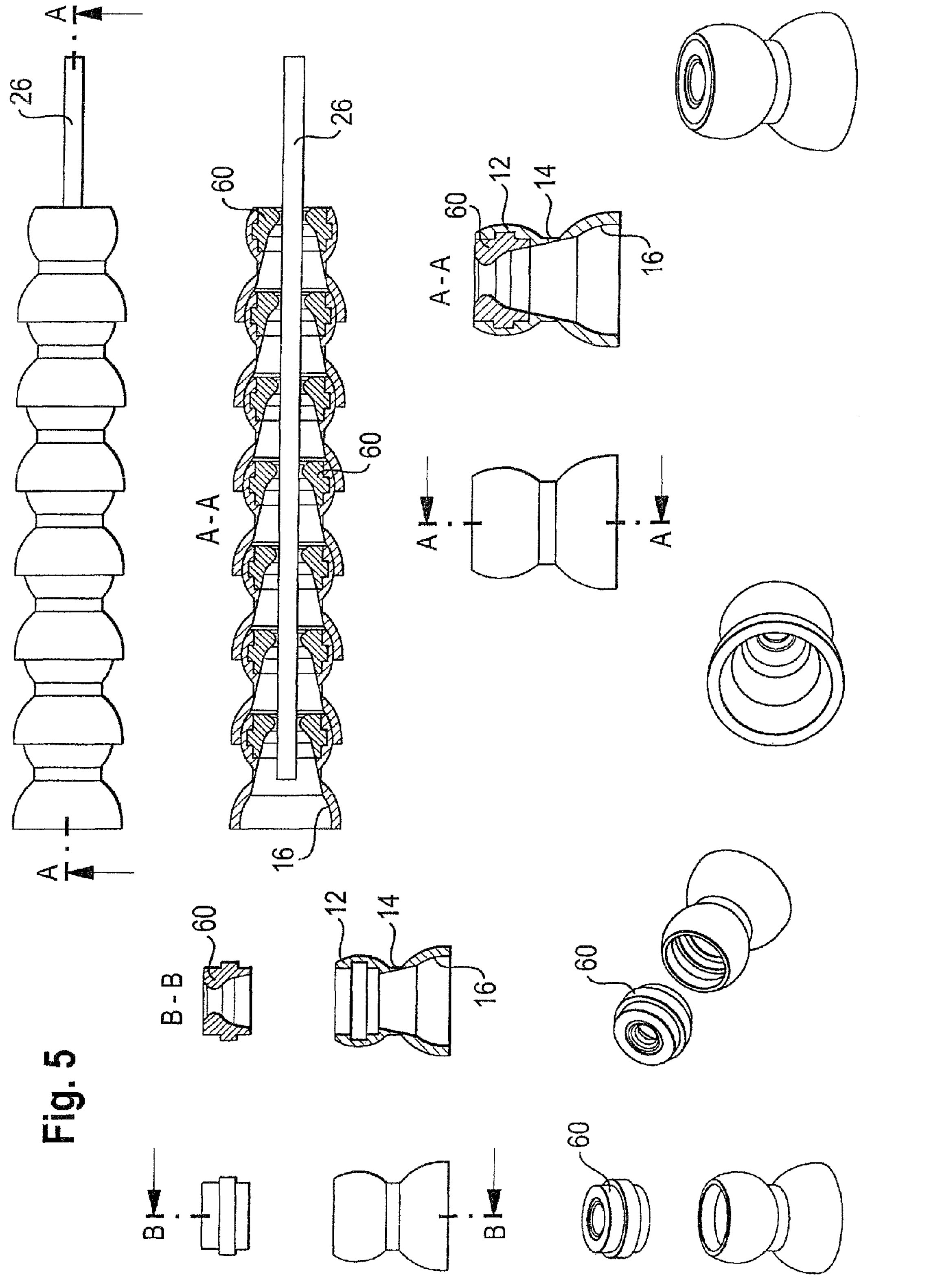
FIG. 5 show a guide device according to a fifth embodiment.

FIG. 5 shows a fifth embodiment. The same reference numerals are used for the parts known from the preceding embodiments, and reference is made to the above explanations in this regard.

The fifth embodiment differs from the preceding embodiments in that a closed ring 60 is used as guiding formation for the welding wire, the ring being made of a low-friction material, for example ceramics. The ring 60 is firmly anchored in the base body 14, more particularly already cast into it. As a result, the ball head 12 is exclusively formed by the material of the base body 14. On its inner surface, the ring 60 has a rounded contour which, starting from the narrowest cross-section, widens towards all sides with a smooth rounding. In this way, a smoothly rounded guide surface is provided, irrespective of the angle in which the welding wire is guided through the ring 60.

Figure 6:
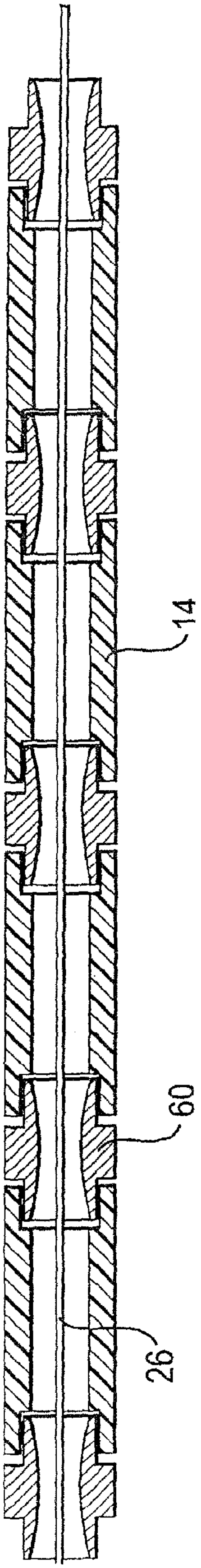
FIG. 6 shows a guide device according to a sixth embodiment.
Figure 7:
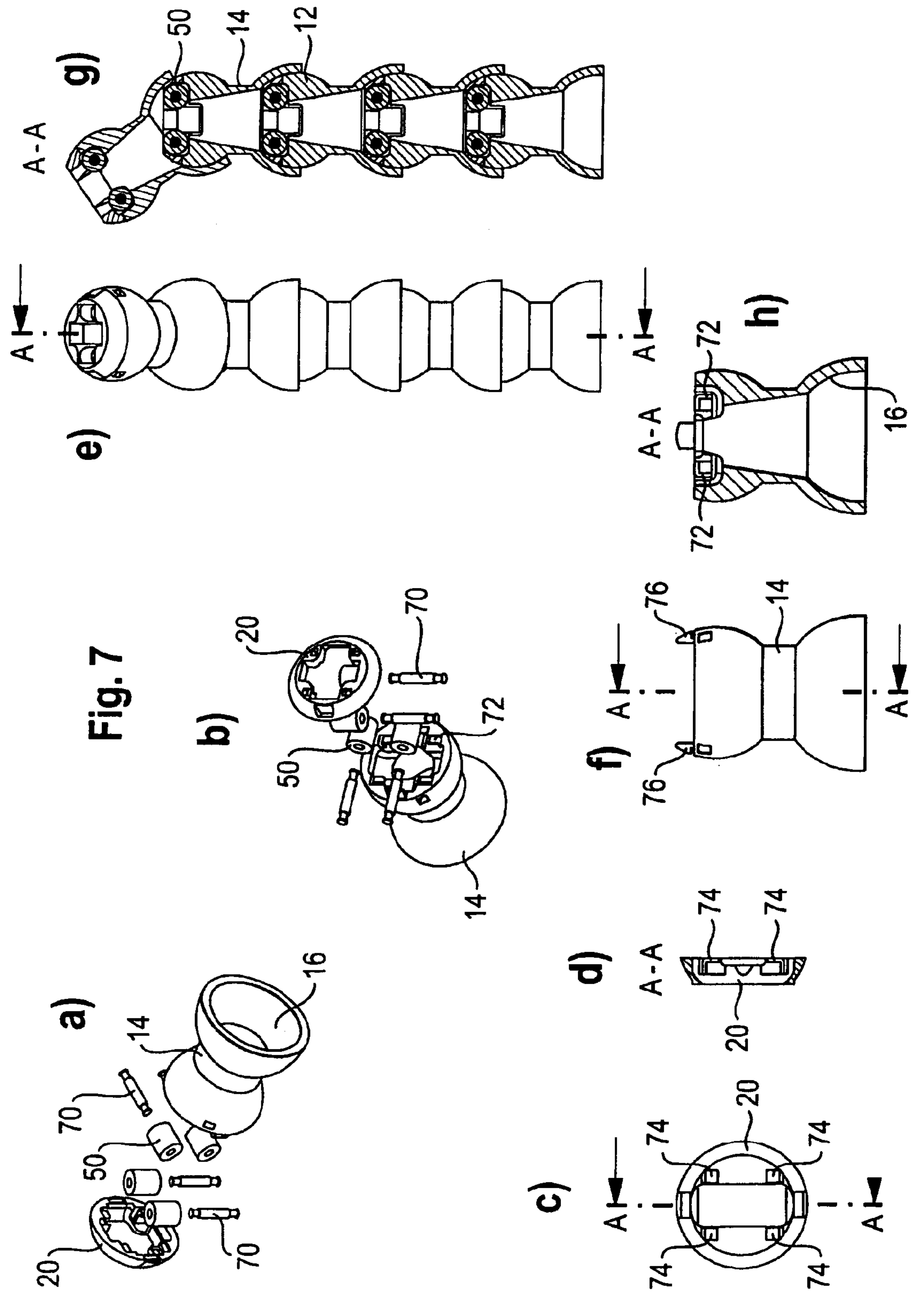
Figure 7I:
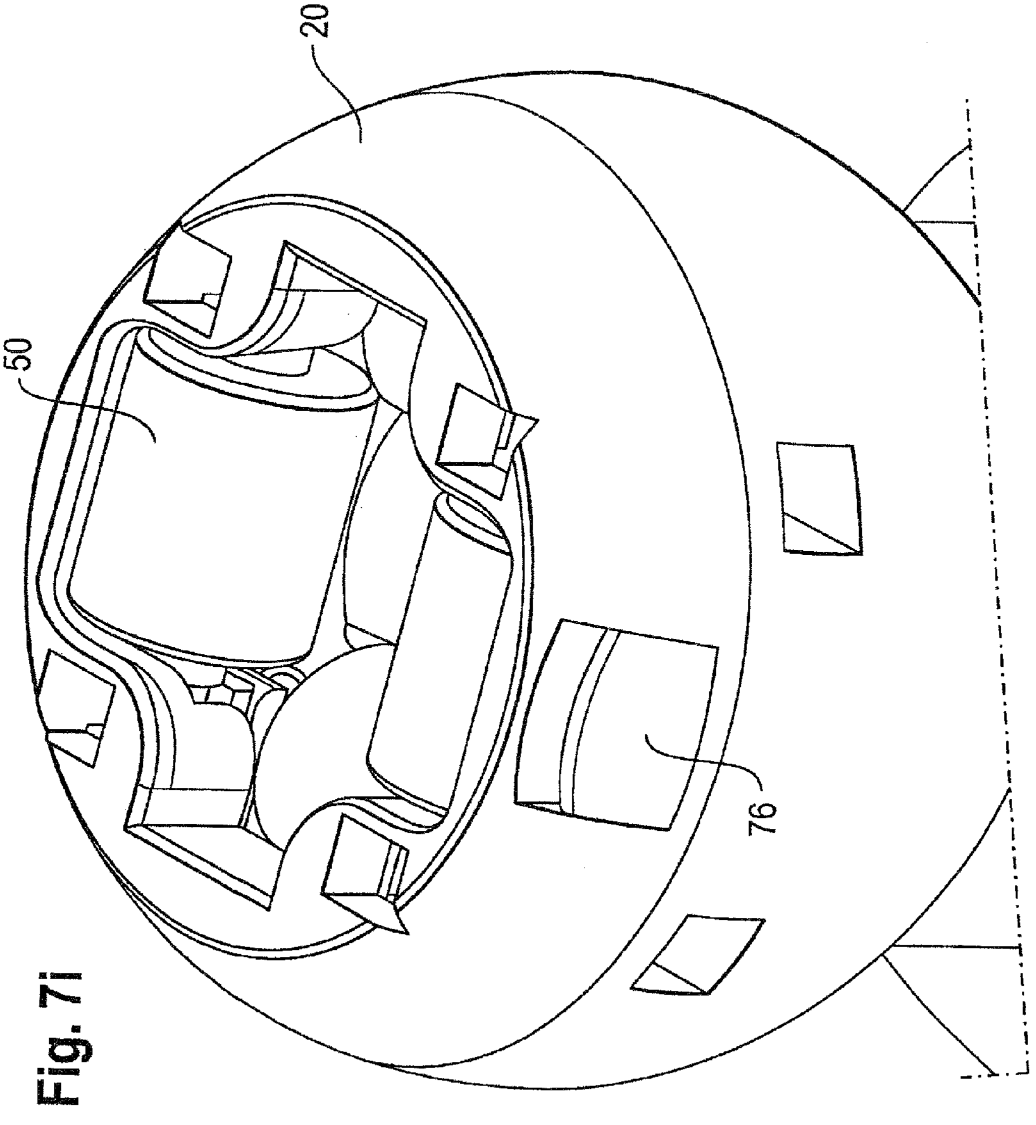
Figure 7J:
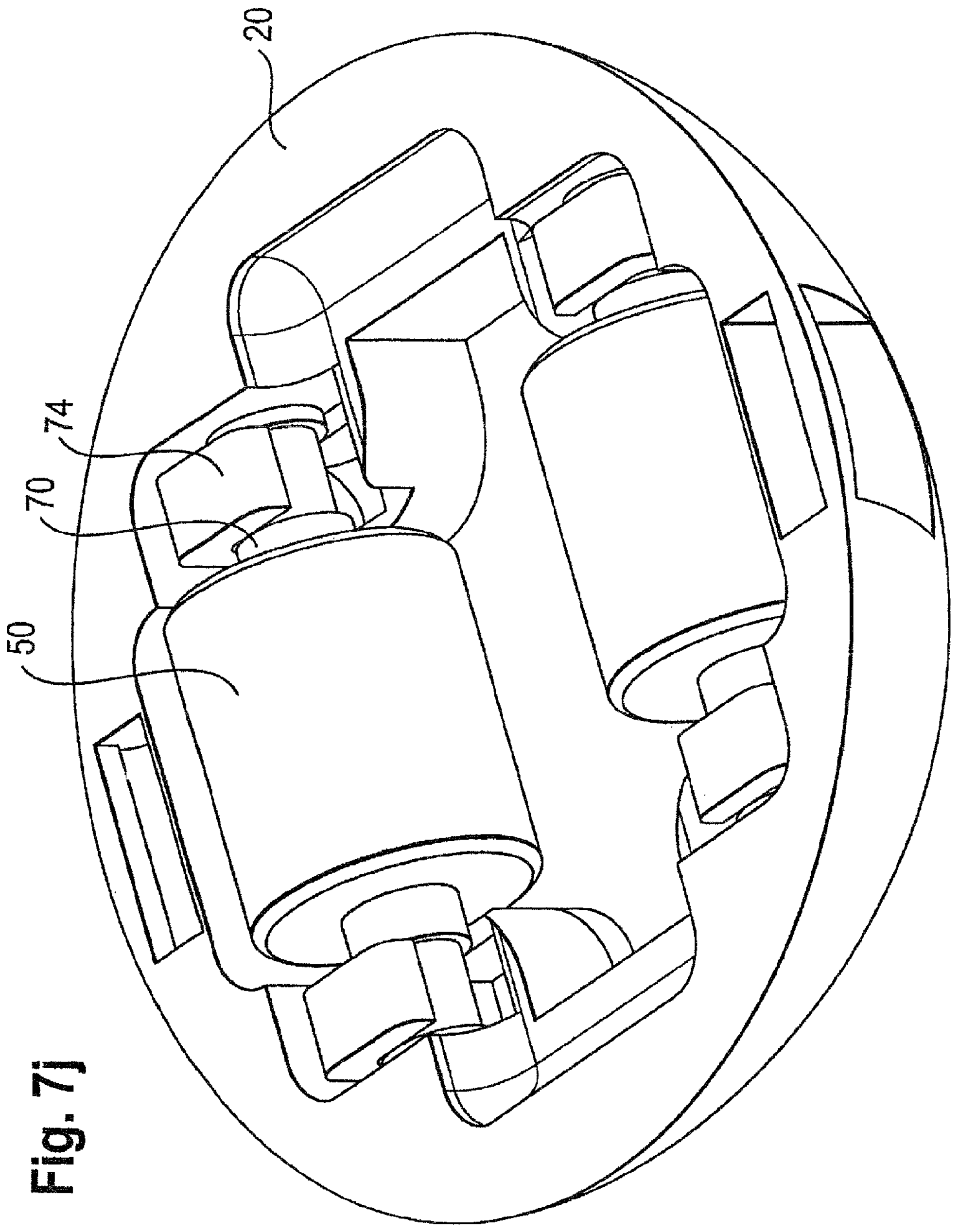
Figure 7K:
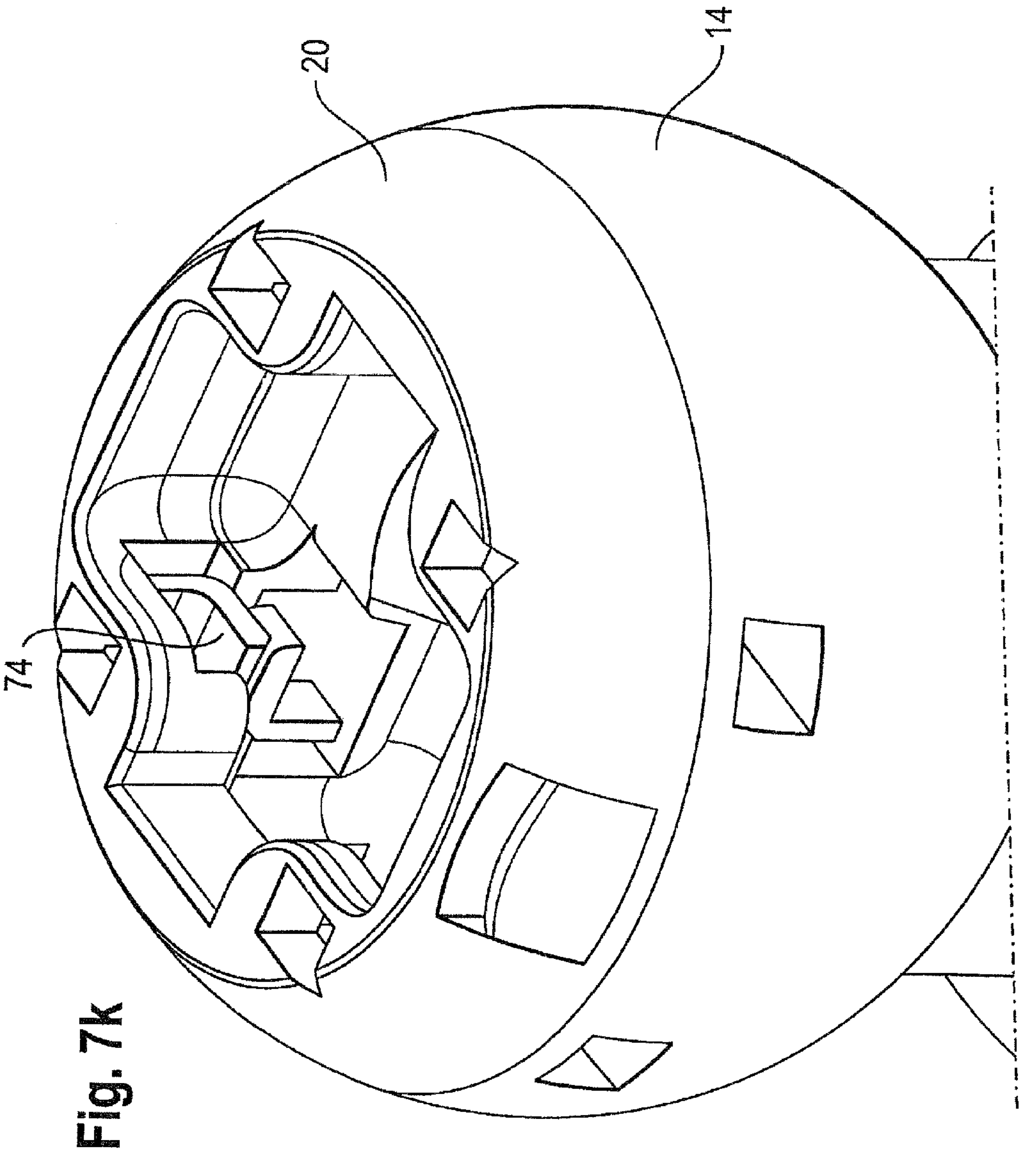
Figure 7I:
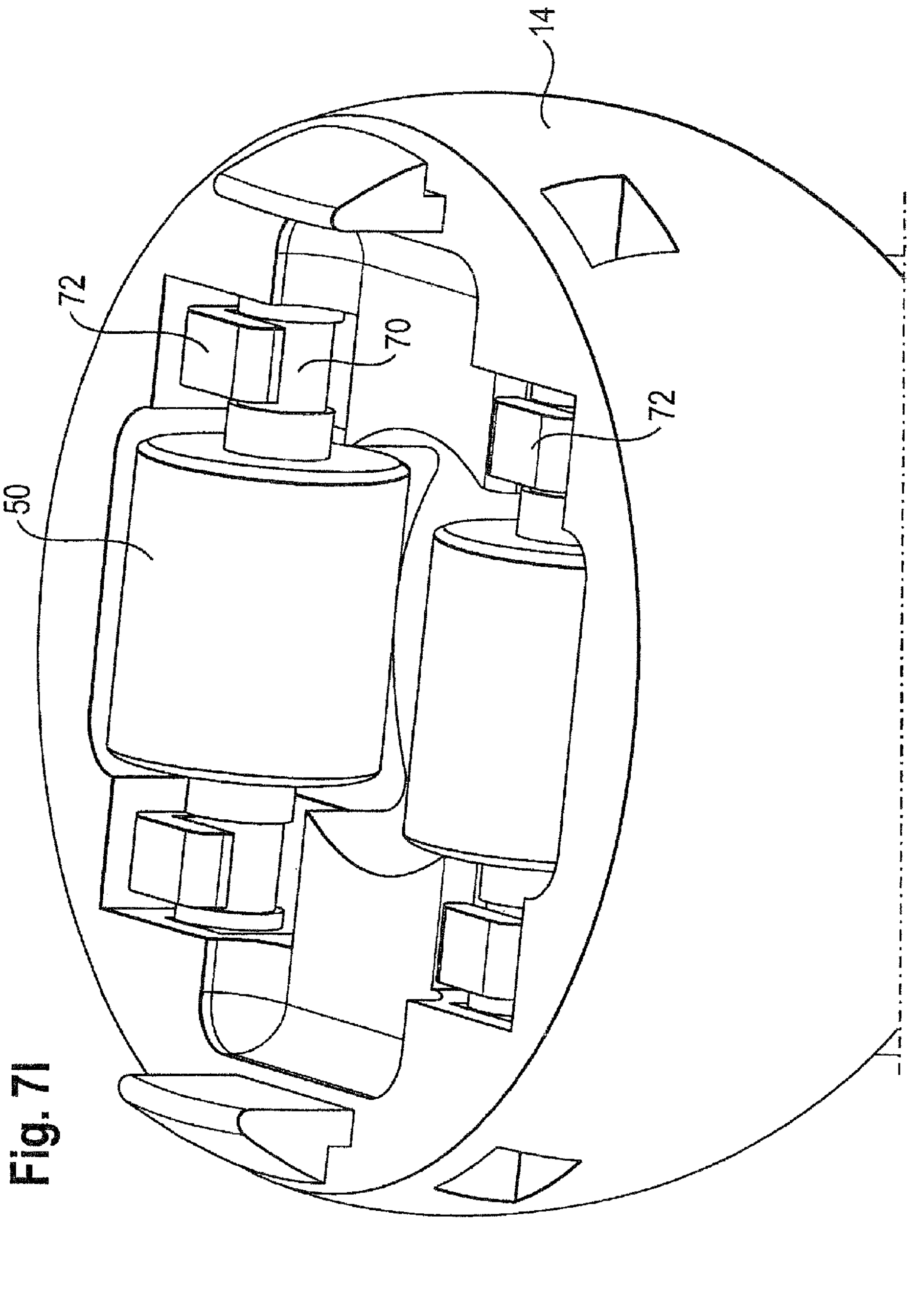
Figure 7M:
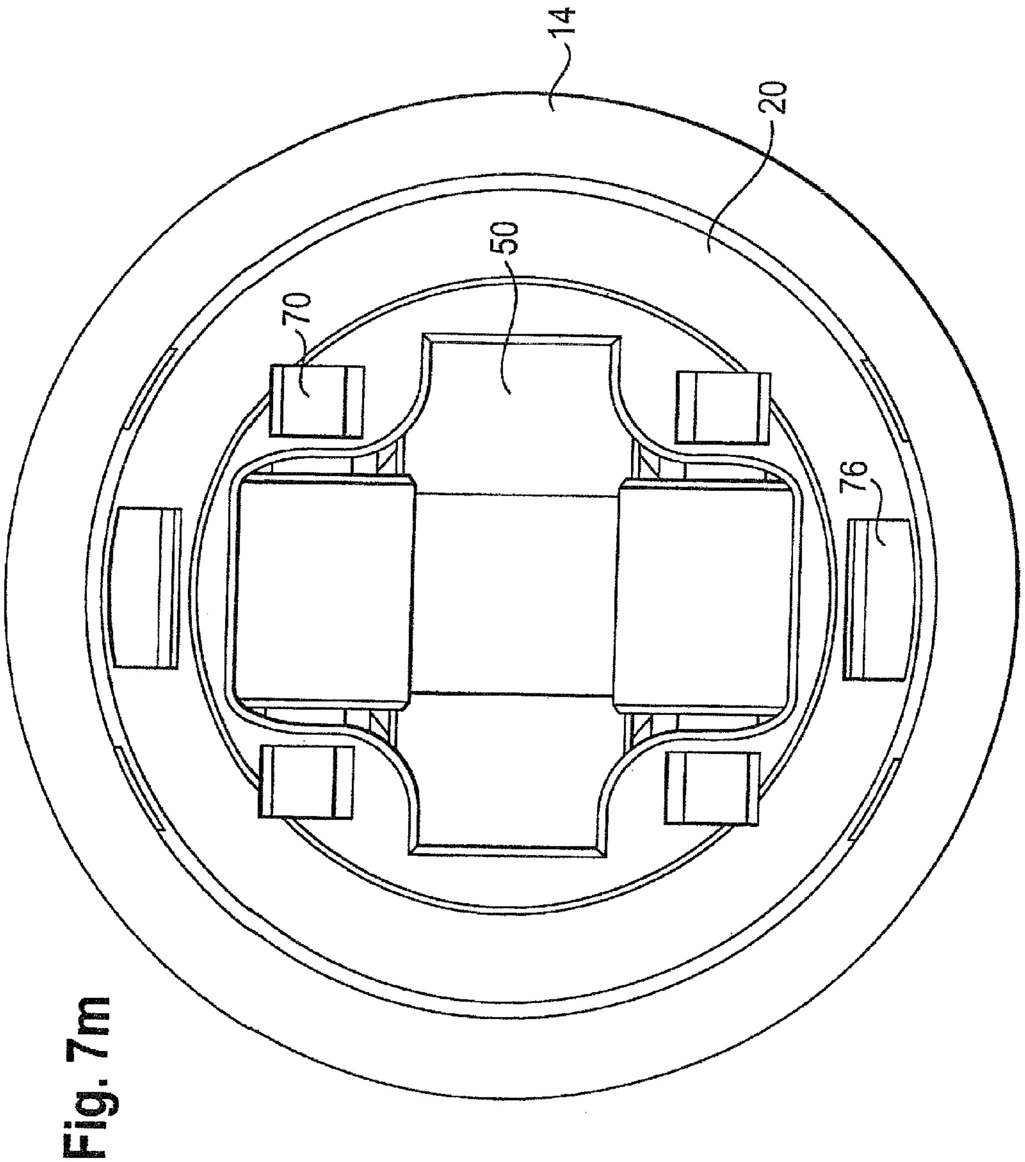

FIG. 6 shows a simplified embodiment which uses the rings 60 known from the fifth embodiment. Each ring is provided with a surrounding shoulder on both sides, the shoulder having a short tube section placed thereon. The tube section consists of an elastically deformable material, for example plastic, so that mobility is ensured in all directions. This means that each individual element is formed of a ring and a tube section. Differing from the preceding embodiments, the mobility here is not given by the movement of a rigid individual element in relation to the neighboring one, but on the basis of the individual elements' own elasticity, which in the final analysis leads to a mobility of the individual elements relative to each other.

FIGS. 7 and 7*a*-7*m* shows a seventh embodiment. The same reference numerals are used for the parts known from the preceding embodiments, and reference is made to the above descriptions in this respect.

The seventh embodiment differs from the fourth embodiment in that the cylindrical rolling bodies 50 are mounted on pins 70. The pins are inserted behind holding lugs 72 in the base body 14 and behind holding lugs 74 in the extension 20. For one thing, the rolling bodies 50 can rotate freely on the pins 70 involving low friction. For another thing, the pins can rotate freely between the holding lugs and the base body or the extension involving low friction. This ensures a smoothly running guiding formation for the welding wire even when dirt collects in the region of the guiding formation. Even if one of the bearing points at the rolling body/pin and pin/holding lugs becomes less smoothly running due to dirt, the remaining bearing point continues to be rotatable with low friction.

The extension 20 is held on the base body 14 by two locking tabs 76.

According to a design variant, not illustrated, the rolling bodies may also be provided with small bearing prolongations which are held behind the holding lugs. In this case, the bearing prolongations rotate behind the holding lugs.

Figure 8:
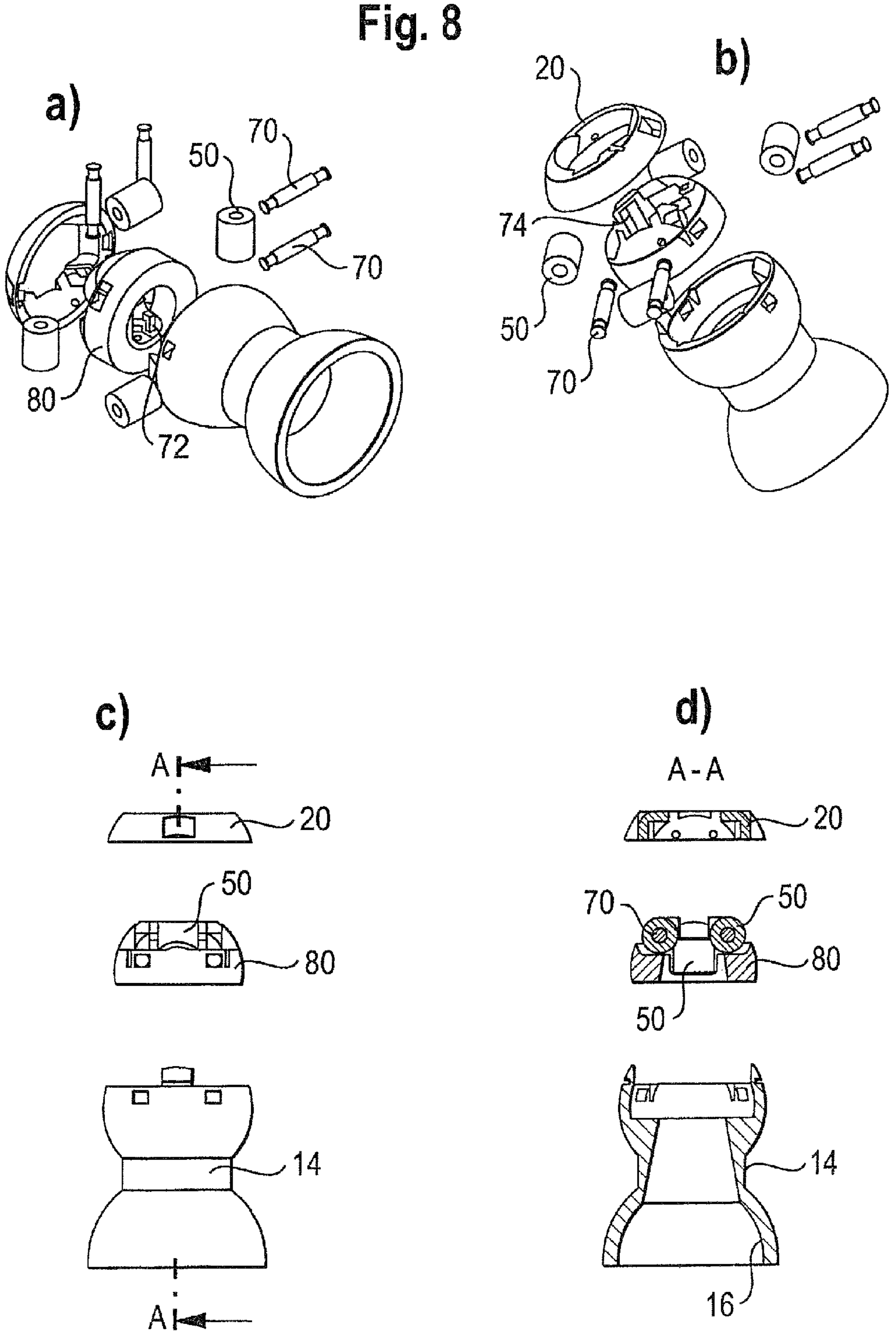

FIGS. 8 and 8*a*-8*s* shows an eighth embodiment. The same reference numerals are used for the parts known from the preceding embodiments, and reference is made to the above explanations in this respect.

The eighth embodiment differs from the seventh embodiment in that the two pairs of cylindrical rolling bodies are mounted in an intermediate ring 80. The latter is provided with the holding lugs 72 and 74.

Figure 9:
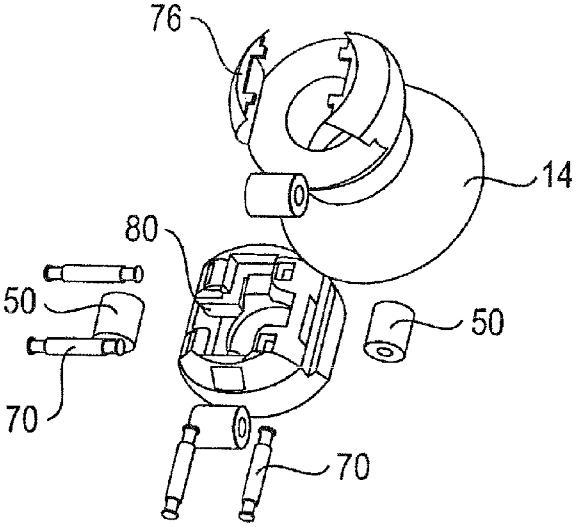
FIG. 9 show a guide device according to a ninth embodiment.
Figure 9:
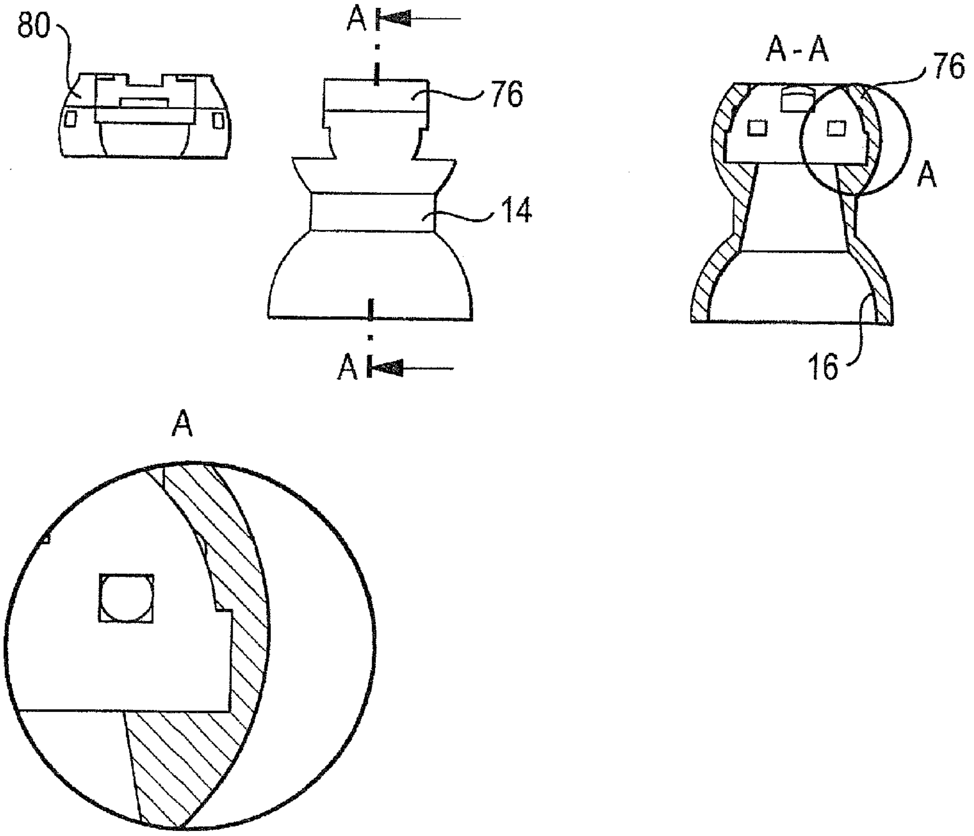

FIG. 9 shows a ninth embodiment. The same reference numerals are used for the parts known from the preceding embodiments, and reference is made to the above explanations in this respect.

The ninth embodiment differs from the eighth embodiment to the effect that the extension 20 has been omitted. Instead, the intermediate ring 80 which accommodates the rolling bodies is made to be so large that it forms the upper half of the ball head 12. It is held on the base body 14 by two locking tabs 76 of a large size.

A suitable material for the base body 14 and also for the extension 12 is, in particular, plastic, preferably polyamide. It is basically also possible to produce the base bodies from a different material, for example metal or wood.

The second, fourth, and seventh to ninth embodiments are particularly suited for the guiding formation of the welding wire from the welding wire container to the transport rollers for the welding wire, i.e. in that region in which the welding wire is pulled. There it is important to provide a guiding formation having rolling bearings in the curved portions of the welding wire guide device, since this reduces friction. In this region of the welding devices, the dimensions of the welding wire guide device are not overly important, so that the slightly larger outside diameter of the guide device, caused by the rolling bodies to be accommodated, does not make a difference. In the region between the transport rollers and the welding head, preferably the welding wire guide device according to the fifth embodiment is used. There the welding wire is pushed, so that the friction occurring is of secondary importance, whereas the smaller outside diameter of the welding wire guide device, which can be obtained owing to the ring 60 that can be produced so as to have small dimensions, is of greater significance.

Figure 10:
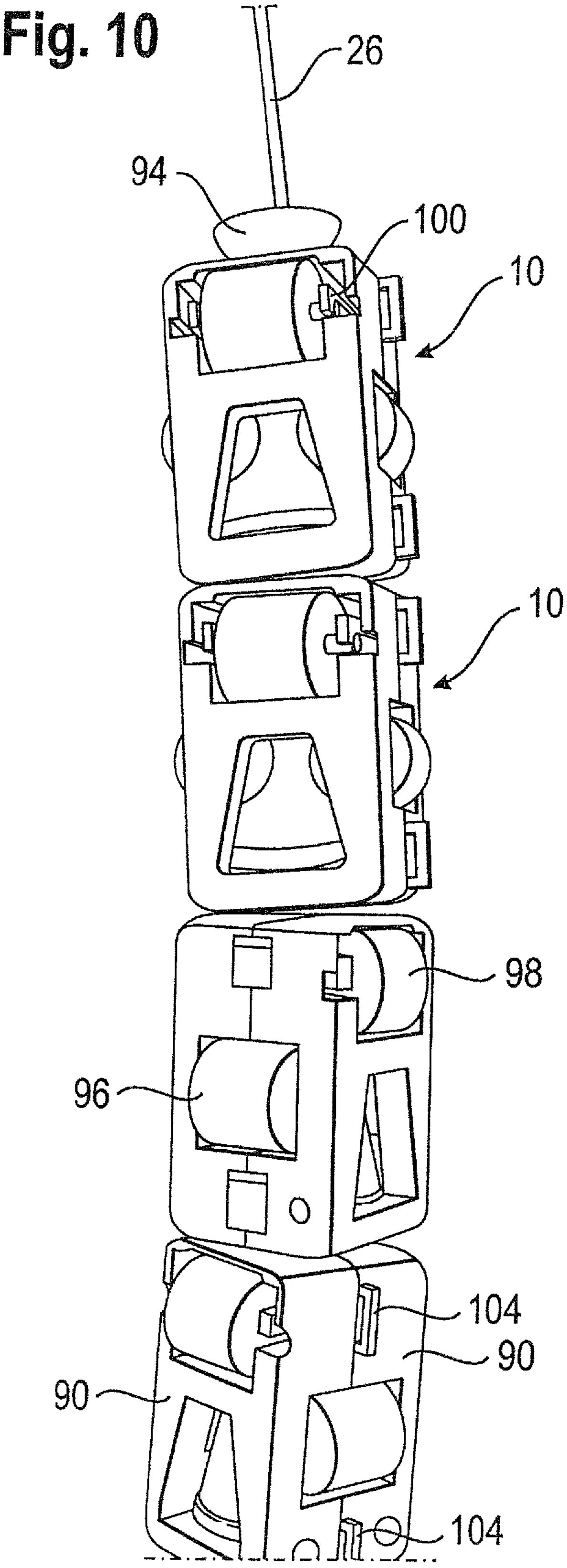
FIG. 10 shows a guide device according to a tenth embodiment.
Figure 11:
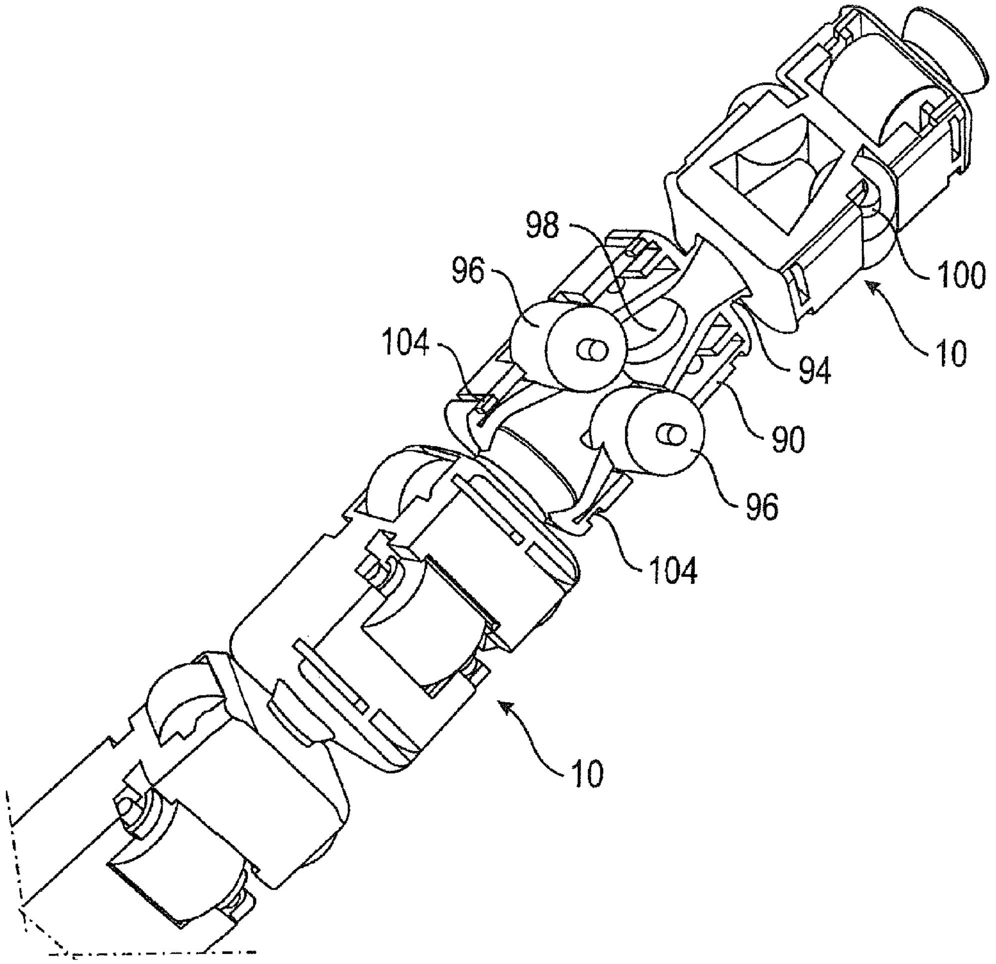
FIG. 11 shows the guide device of FIG. 10, with an individual element being shown in the open condition.
Figure 12:
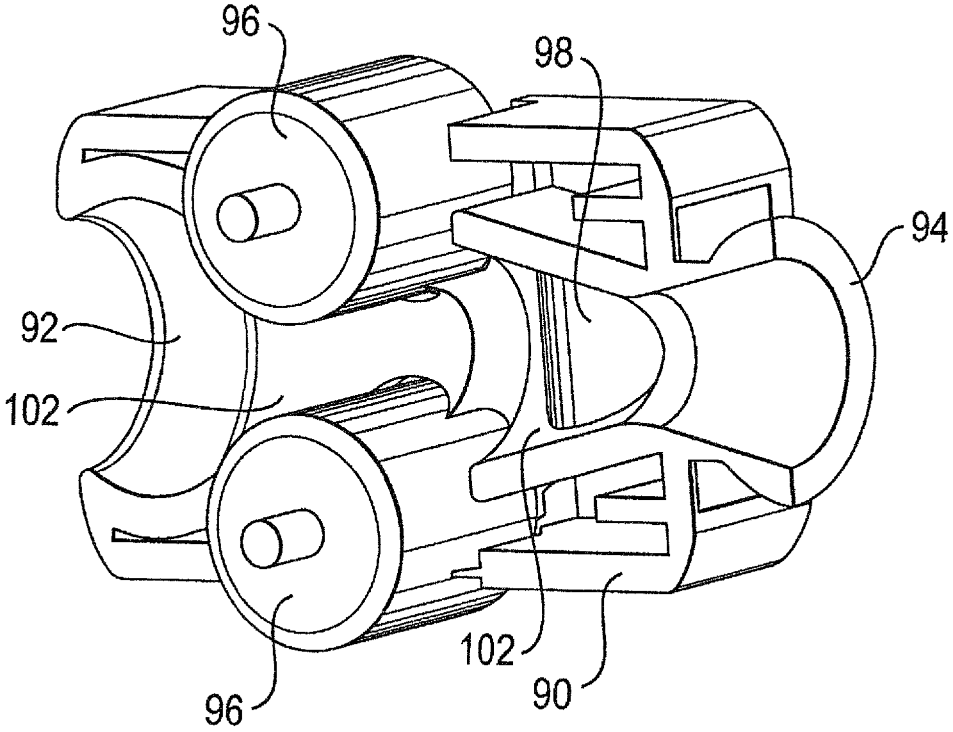
FIG. 12 shows one half of an individual element for the guide device of FIG. 10.

FIGS. 10 to 12 illustrate a tenth embodiment. In this embodiment, too, the welding wire guide device is formed by a multitude of individual elements 10 which are coupled to each other in an articulated manner, more specifically by a ball joint-type connection which allows the individual elements to shift by a specific amount relative to the neighboring individual element and also to rotate about their longitudinal axis.

Each individual element 10 consists of two halves 90 which are clipped to each other to form an individual element 10. Each half 90 includes a bearing cup section 92 extending over 180° in the circumferential direction and a bearing cup section 94 likewise extending over 180°. As can be seen in the Figures, in the tenth embodiment no spherical segment that contains a great circle of the sphere is used for the articulated connection between the individual elements, but, viewed mathematically, for the bearing head only a spherical layer is used which does not contain a great circle of the respective sphere and is accommodated in a small bearing cup section.

A total of four guide rollers 96, 98 forming the guiding formation for the welding wire are arranged opposite each other in pairs in each individual element 10. Each guide roller is provided with a pivot pin, the pivot pins of the two guide rollers 96 being oriented perpendicularly to the pivot pins of the two guide rollers 98. The pivot pins may be formed in one piece with the guide rollers or may be separate components having the guide rollers slipped thereon.

The two guide rollers 96 are mounted in two different halves 90 of the respective individual element. The guide rollers 98, on the other hand, are each mounted in one of the halves 90 of the respective individual element. To this end, snap-in hooks 100 are provided there which allow the respective guide roller to be inserted into the individual elements from the outside, so that it will automatically lock in place there.

Guide surfaces 102 for the welding wire are provided inside each individual element 10, which ensure that the welding wire can be threaded into the guide device. The guide surfaces make sure that the welding wire can be pushed through the individual elements joined to each other in line, without the foremost end of the welding wire getting caught somewhere.

In the tenth embodiment, it is of particular advantage that the individual elements have an approximately square cross-section, here with rounded corners. Although the guide rollers 96, 98 project beyond the outer surface of the respective individual element, they do not project beyond a circular line the center of which is located on the center axis of the respective individual element and which runs through the four corners of the cross-section. This allows a jacket such as a plastic tube, for example, to be slipped onto the guide device, so that any dirt, which could impair the smooth running of the guide rollers, is prevented from penetrating into the series of individual elements. The guide rollers can not lie against the inner wall of the jacket here because they protrude only slightly over the outer surface of the respective individual element. In this way, it is made sure that no undesirable friction occurs when the guide rollers rotate.

A further advantage in the tenth embodiment resides in that when the jacket has been pulled off from the welding wire guide device, the guide rollers are visible from the outside and may therefore be inspected without separating the individual elements from each other or even disassembling them. It is also of advantage that the guide rollers may be designed to have a larger diameter than, for example, in the seventh embodiment, since they are not completely received inside the individual elements, but may project beyond the outer surfaces thereof. The large diameter of the guide rollers results in a lower friction because larger guide rollers are easier to rotate than smaller ones.

It will now be described how the individual elements are assembled and joined together to form a chain. At first, the two guide rollers 96 are placed into one half 90 of an individual element. Then the second half is put on and attached to the first half, so that the two guide rollers 96 are mounted between the two halves 90. The attachment of the two halves to each other is effected by means of suitable locking means, here by means of tabs or clips 104. For positioning the two halves against each other, small positioning means (not illustrated) are provided, for example lugs and depressions. The guide rollers 98 are either subsequently clipped into the two halves or were mounted there already earlier. Then one half 90 of the following individual element is applied to the already finished individual element such that the bearing head thereof, composed of two bearing head sections 94, more precisely the segment of the ball head that is formed, is accommodated in the bearing cup section 92 of the half 90 that is applied. After the second half 90 is put on, the segment of the bearing head of the individual body already previously put together is received and held in the bearing cup, formed of the two bearing cup sections 92, of the newly assembled individual body. A special advantage consists in that the individual elements are attached to each other so as to be non-releasable. In contrast to the preceding embodiments, in which the ball head of an individual element has snapped into the ball socket of the neighboring individual element and could be pulled out of it again by applying an appropriately large force, the individual elements in the tenth embodiment are fitted to one another in a form-fitting manner, so that they can be released from one another again only by separating the two halves 90.

The maximum swivel angle of an individual element in relation to the neighboring individual element is determined by the engagement of the front faces, located opposite each other, of the neighboring individual elements. Irrespective of the swiveling motion, each individual element can rotate freely about its longitudinal axis in relation to the neighboring individual element. In operation, the individual elements are therefore all oriented differently (but evenly distributed statistically) so that, irrespective of the particular curvature of the guide device, the welding wire is evenly well guided.

Figure 13:
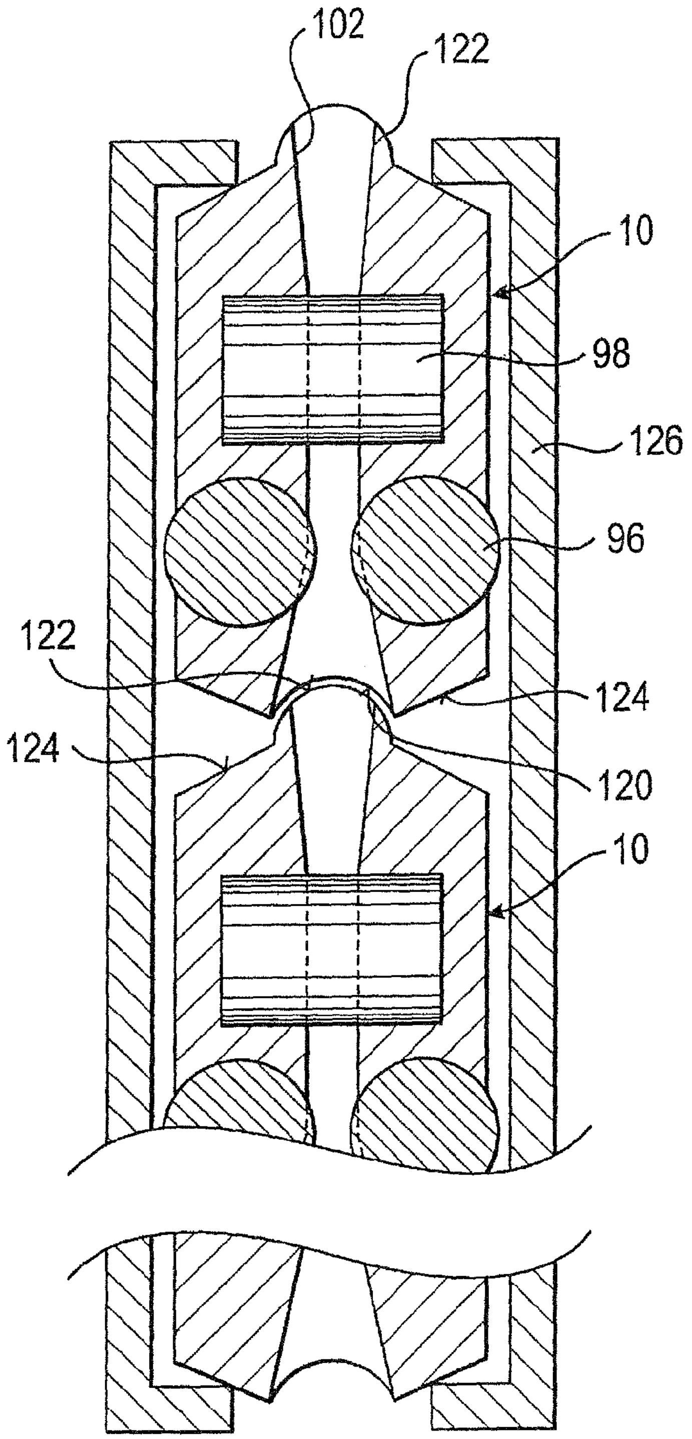
FIG. 13 schematically shows a guide device according to an eleventh embodiment.

FIG. 13 schematically shows an eleventh embodiment, which differs from the preceding embodiments in that the individual elements 10 are no longer coupled to each other by an actual joint, but are only mutually supported in an articulated manner. For this purpose, one end of each individual element is provided with a joint depression 120 in which a joint projection 122 of the neighboring individual element 10 is supported. The faces of the joint depression 120 and of the joint projection facing each other preferably have the same or at least substantially the same curvature. The front faces 124 of the individual elements are designed in the shape of a truncated cone, so that the individual elements can be tilted in relation to each other, without the joint projection being required to disengage from the associated joint depression. A jacket 126 ensures that the individual elements are held together in the longitudinal direction; the jacket firmly holds the two elements arranged at the end of the chain formed by the individual elements and is able to apply the necessary holding force even in the longitudinal direction. A fabric hose or a plastic tube may be used for the jacket, for example.

Guide rollers 96, 98 which are arranged opposite each other in pairs are made use of for the guiding formation in the eleventh embodiment as well. They are inserted into suitable receiving openings from the outside and are held there, for example by locking tabs which engage the bearing pins.

In the longitudinal direction, a channel for the welding wire extends through each individual element, the channel being defined by the guide surfaces 102 which, for their part, are interrupted by the guide rollers 96, 98.

According to a further development which is not illustrated, instead of the joint projection on the individual elements, a ball head may be used which locks in place in a suitable joint socket in the neighboring individual element.

The invention claimed is:

1. A flexible guide device, for a welding wire, said device being formed by a plurality of individual elements which are connected to each other in an articulated manner, wherein the individual elements are adapted to swivel in relation to each other in any direction, and wherein the individual elements are provided with guide rollers for said welding wire, wherein said guide rollers are rotatably mounted on pivot pins and fitted through exterior openings in the individual elements.

2. The flexible guide device according to claim 1, wherein the individual elements are connected to each other in an articulated manner by a ball joint.

3. The flexible guide device according to claim 2, wherein each individual element includes a ball socket at one end, and a ball head at an other end.

4. The flexible guide device according to claim 3, wherein the ball head of an individual element is locked in place in the ball socket of a neighboring individual element.

5. The flexible guide device according to claim 3, wherein the ball head is formed by an extension which is fitted to the base body of the respective individual element.

6. The flexible guide device according to claim 3, wherein the ball head is formed by an extension in combination with a part in the shape of a spherical segment of the respective individual element.

7. The flexible guide device according to claim 1, wherein the guide rollers are cylinder rollers.

8. The flexible guide device according to claim 1, wherein each individual element is formed of two halves which are locked to one another.

9. The flexible guide device according to claim 1, wherein each individual element is provided with the first and second pairs of guide rollers rotatably mounted on pivot pins, the pivot pins of the first pair being oriented roughly perpendicularly to the pivot pins of the second pair.

10. The flexible guide device according to claim 9, wherein the pivot pins of at least two guide rollers are locked in place in the body of the individual element.

11. The flexible guide device according to claim 9, wherein the guide rollers project beyond the outer surface of the individual element.

12. The flexible guide device according to claim 9, wherein each individual element has a square cross-section having four corners, and that the guide rollers do not project beyond a circular line which runs through the four corners of the individual element.

13. The flexible guide device according to claim 1, wherein the base body is made of a plastic material.

14. The flexible guide device according to claim 1, wherein the individual elements are mutually supported in an articulated manner and a jacket is provided which holds the individual elements together in a longitudinal direction.

15. The flexible guide device according to claim 10, wherein the guide rollers project beyond the outer surface of the individual element.

16. The flexible guide device according to claim 10, wherein each individual element has a square cross-section, and that the guide rollers do not project beyond a circular line which runs through the four corners of the individual element.

17. The flexible guide device according to claim 11, wherein each individual element has a square cross-section, and that the guide rollers do not project beyond a circular line which runs through the four corners of the individual element.

18. The flexible guide according to claim 12, wherein each individual element has a square cross-section with rounded corners.

19. The flexible guide according to claim 16, wherein each individual element has a square cross-section with rounded corners.

20. The flexible guide according to claim 17, wherein each individual element has a square cross-section with rounded corners.

21. A flexible guide device, for a welding wire, said device being formed by a plurality of individual elements which are connected to each other in an articulated manner, wherein the individual elements are adapted to swivel in relation to each other in any direction, and wherein each individual element is formed of two like halves which are locked to one another, each half having a bearing cup section extending over 180° and a bearing head section, which together form a complete bearing cup within one element, for receiving a complete bearing head of an adjacent element.

22. The flexible guide device according to claim 21, wherein the individual elements are connected to each other by tabs or clips.

* * * * *

UNITED STATES PATENT AND TRADEMARK OFFICE

CERTIFICATE OF CORRECTION

PATENT NO. : 8,450,645 B2
APPLICATION NO. : 12/593271
DATED : May 28, 2013
INVENTOR(S) : Gelmetti It is certified that error appears in the above-identified patent and that said Letters Patent is hereby corrected as shown below:

In the Claims

Claim 9, Col. 8, line 47, delete “the”, “with the first” should read --with first--.

Signed and Sealed this
Twenty-first Day of October, 2014

Michelle K. Lee

Michelle K. Lee
*Deputy Director of the United States Patent and Trademark Office*